United States Patent [19]  [11] 4,123,619
Bolin  [45] Oct. 31, 1978

[54] GAS TERMINATION SUPPORT SYSTEM
[75] Inventor: Philip C. Bolin, Westborough, Mass.
[73] Assignee: Westinghouse Electric Corp., Pittsburgh, Pa.
[21] Appl. No.: 812,085
[22] Filed: Jul. 1, 1977
[51] Int. Cl.² ............... H02G 15/22; H02G 15/24
[52] U.S. Cl. .................................. 174/19; 174/21 CA
[58] Field of Search .......... 174/12 R, 12 BH, 15 BH, 174/16 BH, 18, 19, 20, 21 C, 21 CA, 31 R, 40 R, 99 E, 100, 142, 161 R

[56] References Cited
U.S. PATENT DOCUMENTS
3,585,271 6/1971 Reynolds et al. .......... 174/21 CA X
3,934,071 1/1976 Tahiliani ........................ 174/19 X Primary Examiner—Laramie E. Askin
Attorney, Agent, or Firm—M. S. Yatsko

[57] ABSTRACT

Gas-insulated electrical apparatus including a generally vertically disposed air termination, a horizontally disposed gas-insulated transmission line, and a transition member aligned with both the termination and the transmission line for interconnecting the transmission line to the termination. Termination support means are utilized for spatially maintaining the termination in its location, and these support means are fixedly secured to the transition member and slidingly supported on a base member. The sliding support compensates for linear thermal expansion of the transmission line while maintaining the support of the termination.

7 Claims, 3 Drawing Figures

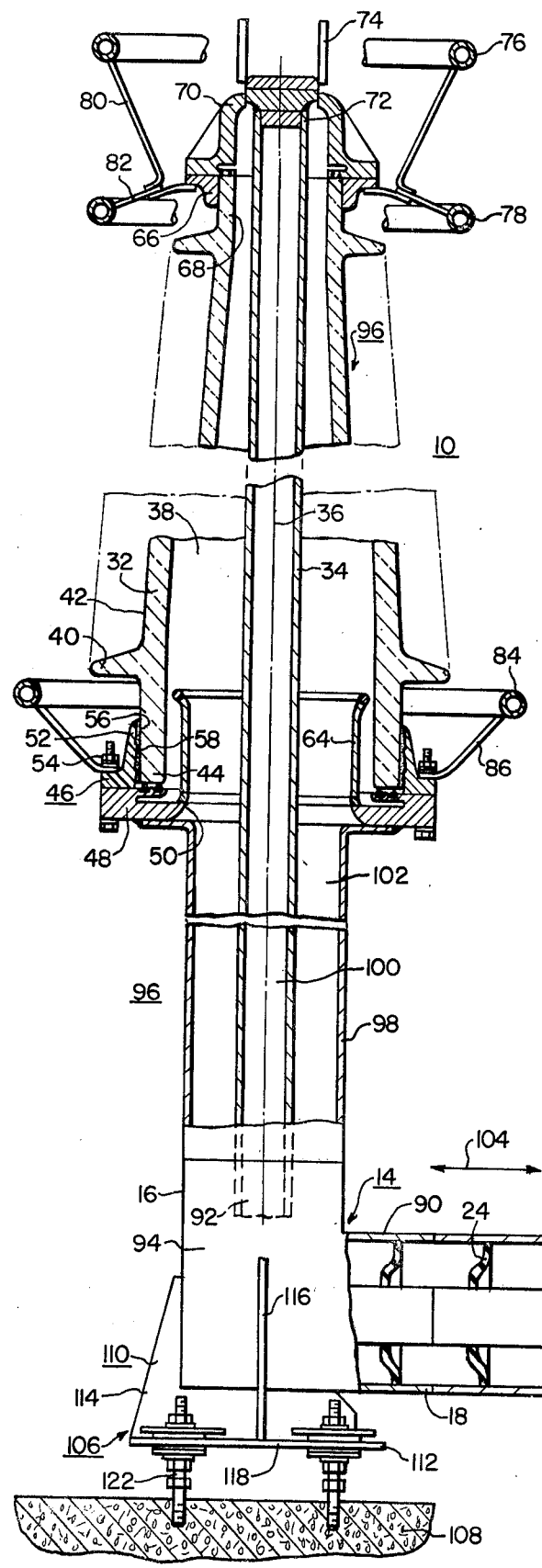

GAS TERMINATION SUPPORT SYSTEM

BACKGROUND OF THE INVENTION

This invention relates generally to electrical apparatus and more particularly to a support system for a gas-air termination.

Compressed gas-insulated transmission lines are being used in an ever increasing scale in recent years due to the desirability of increasing safety, problems in acquiring the necessary right-of-way for overhead lines, and higher power loads required by growing metropolitan areas and growing demands for electrical energy. Gas-insulated transmission lines typically comprise a hollow outer sheath, an inner conductor disposed within the sheath, a plurality of solid insulating spacers which support the conductor, and a compressed gas such as sulfur hexafluoride in the outer sheath for electrically insulating the inner conductor from the outer sheath. Gas barriers may be provided at intervals along the length of the transmission line for isolating the various sections on the line, and it is known to provide a particle trap as it is disclosed in the patent to Trump, U.S. Pat. No. 3,515,939.

Th majority of gas-insulated transmission lines installed to date have generally been for electric power station getaways or high-voltage transmission line dips. In these types of installations, the gas-insulated transmission line is connected to overhead power lines which then transmit the energy where desired. The connection of the gas-insulated transmission line to the overhead power line generally occurs through an gas-air termination. These terminations are generally positioned at elevations approximately that of the overhead transmission line, so that the termination is disposed vertically above the ground. The vertically disposed termination must then be interconnected to the gas-insulated transmission line, which in the majority of installations, will be disposed generally horizontally.

One disadvantage which has been found with this type of installation is providing the necessary support for the elevated gas-air termination. Since the termination is disposed off the ground, a support structure must be utilized to maintain the termination in its spatial location. The problem arises in that the generally horizontally disposed transmission line will typically experience longitudinal or horizontal movement due to thermal expansion of the line itself. The support for the air termination must, therefore, not only provide vertical support for the termination, but also allow for horizontal or longitudinal movement thereof to compensate for the thermal expansion of the transmission line.

The prior art structures utilized to support the gas-air termination generally are elevated structures having large openings therein at the top thereof. These structures are disposed vertically lower than the termination, with the transmission line connection to the horizontally disposed transmission line extending through the opening of the support structure. The support structure opening is larger than the transmission line, and is larger a distance which will allow for the longitudinal movement of the connection due to horizontal expansion of the transmission line proper. The outer shell of the termination then rests upon the support structure to maintain its elevated position.

A drawback with this type of support is its large expense. When phases of a three-phase transmission system are separated for the normal air clearances for the overhead transmission line, separate, distinct structures must be utilized for supporting each gas-air termination. The cost of erection, and the materials required in their construction, are expensive, and it is desirable to provide a more economical support means for supporting the gas-air termination.

SUMMARY OF THE INVENTION

According to the invention, a more desirable gas-insulated electrical apparatus is provided which comprises a generally vertically disposed gas-insulated termination, a generally horizontally disposed gas-insulated transmission line, and a gas-insulated transition member having end sections aligned with the termination and the transmission line. The outer members of each segment are fixedly secured to each other, and the conductors disposed within each segment are electrically connected. The termination is supported by support means which comprise a base, a frame member which is fixedly secured to the outer housing and extends outwardly therefrom, and a sliding support means for supporting the frame member on the base.

BRIEF DESCRIPTION OF THE DRAWINGS

Reference is now made to the description of the preferred embodiment, illustrated in the accompanying drawings, in which:

FIG. 1 is an elevation view of the electrical apparatus of the invention;

FIG. 2 is a detailed view of the termination support means; and

FIG. 3 is a plan view of the horizontally disposed plate illustrating how thermal expansion is compensated for.

DESCRIPTION OF THE PREFERRED EMBODIMENT

Referring now to FIG. 1, therein is illustrated the electrical apparatus according to the teachings of this invention. The apparatus comprises a generally vertically disposed gas-air termination 10, a generally horizontally disposed gas-insulated transmission line 12, and a gas-insulated transition member 14. The transition member 14 has first and second end sections 16, 18 respectively, with the first end section 16 being aligned with the termination 10, and the second end section 18 being aligned with the transmission line 12.

The gas-insulated transmission line 12 generally includes a cylindrical, hollow outer sheath 20, an inner conductor 22 disposed within the outer sheath 20, and support insulators 24 spaced along the length of the transmission line 12 for insulatably supporting the inner conductor 22 within the outer sheath 20. The inner conductor 22 and the outer conductor 20 are both of a good electrically conducting material such as aluminum, with the inner conductor being at a high potential with respect to the typically grounded outer sheath 20. An insulating gas 26, typical of which is sulfur hexafluoride, is disposed within the outer sheath 20 and electrically insulates the inner conductor 22 from the outer sheath 20.

The gas-air termination 10 comprises a hollow, elongated insulating shell 32, a central termination conductor 34 extending along the axis 36 of the insulating shell 32, and an insulating gas 38 disposed within the insulating shell 32 and which typically may be sulfur hexafluoride. The insulating shell 32, which may be of porcelain or epoxy, has a plurality of skirts 40 along the outer surface 42 thereof, and is typically of a conically-tapering cross-section. The shell 32 is secured, at end portion 44, to a flange ring 46. The flange ring 46 is comprised of a generally planar, cylindrical base member 48 having a central opening 50 therethrough, and a longitudinal extension 52 which is secured to the base member 48 by means such as bolts 54. The longitudinal extension 52 is disposed adjacent the outer surface 56 of the end portion 44 of the insulating shell 32. A cement 58 is disposed between the longitudinal extension 52 and the end portion 44, with the cement 58 securing the end portion 44 and thereby the insulating shell 32 to the longitudinal extension 52. The base member 48 and the longitudinal extension 52 are of an electrically conducting material, and are typically at ground potential. Secured to the base member 48 is a corona ring 64 which functions to shape the electric field caused by the termination conductor 34 as desired.

The upper hardware of the termination 10 consists of a metallic ring 66 which is cemented to the upper end 68 of the insulating shell 32, and an upper metallic cap 70 which is secured to the ring 66 and to the upper end 72 of the termination conductor 34. The upper cap 70 has secured thereto a terminal connector 74 for receiving the ends of overhead lines which may be connected to the termination 10. Suitable corona rings 76 and 78 are connected to the metallic cap 70 and thereby to the upper end 72 of the termination conductor 34 by the connection wires 80 and 82. A lower corona ring 84 is connected to the longitudinal extension 52, and thereby to ground, by the support wires 86.

The transition member 14 is in the form of an elbow, so that the end section 16 of the transition member 14 is aligned with the termination 10, and the end section 18 is aligned with the transmission line 12. The transition member 14 is comprised of an outer housing 90, a transition conductor 92 disposed within the outer housing 90, and an insulating gas 94 which may be sulfur hexafluoride disposed within the outer housing 90 for electrically insulating the transition connector 92 from the outer housing 90. The outer housing 90 at the location of the end section 18 is fixedly secured to the outer sheath 20 of the transmission line 12, and the transition conductor 92 at that same end section is fixedly secured to the inner conductor 22 of the transmission line 12. This securing may be accomplished by, for example, welding the members together. The outer housing 90 at the other end section 16 may be fixedly secured to the termination 10, and more particularly the base member 48, directly, through housings which are associated with the termination 10, or, as is illustrated, via an extension line 96 which is utilized to achieve the desired elevation of the termination 10. The extension line 96 is aligned with both the termination 10 and the end section 16 of the transition member 14, and comprises an outer enclosure 98 fixedly secured to the base member 48 at one end and to the outer housing 90 at the end section 16 of the transition member 14. Disposed within the outer enclosure 98 is an extension conductor 100 which is secured to the termination conductor 34 and the transition conductor 92. An insulating gas 102 is disposed within the outer enclosure 98 and electrically insulates the extension conductor 100 from the outer enclosure 98. The insulating gas 102 within the outer enclosure 98 may also be sulfur hexafluoride. The extension line 96 functions to provide the necessary elevation so that the termination 10 is disposed adjacent the overhead lines, and is utilized for securing the outer housing 90 of the transition member 14 to the insulating shell 32, while the extension conductor 100 is utilized for securing the transition conductor 92 to the termination conductor 34.

Since the termination 10, extension line 96, transition member 14 and transmission line 12 all utilize an insulating gas such as sulfur hexafluoride for electrically insulating the high voltage conductor from the grounded outer member, the insulating gas within each such member may communicate with the insulating gas in every other member. Alternatively, if so desired, the insulating gas within any particular member may be compartmentalized from the insulating gases in the other members, which may be desired so as to prevent the contamination of adjacent members in the highly unlikely event of a high-voltage breakdown. The choice as to whether the gas should communicate amongst the various members is a design choice based upon the desires of the system designer.

Providing support for the termination 10, while compensating for the thermal expansion and growth of the transmission line 12, which would occur in the directions illustrated by the arrows 104, are the support means 106. The support means 106 comprise a base 108 which is physically secured in its location, a frame structure 110 which is physically secured to the outer housing 90 of the transition member 14, and means 112 for slidingly supporting the frame structure 110 on the base 108. The frame structure 110 can comprise a plurality of metal ribs 114, 116 which are welded to the outer housing 90 at spaced locations thereabout, with the ribs 114, 116 being physically secured, again such as by welding, to a generally horizontally disposed plate 118 which is disposed vertically lower than the transition member 14. As shown in FIGS. 2 and 3, the plate 118 has a plurality of horizontally extending slots 120 therein, and the base 108 has a plurality of vertically extending rigid anchoring means 122 such as bolts which extend outwardly from the base 108 and through the slots 120. The bolts 122 have a collar 124 fixedly secured thereto at a location lower than the plate 118 location, and disposed between the collar 124 and the plate 118 is a bearing pad 126. The plate 118 rests upon the bearing pad 126, and is kept from being vertically lifted off the bolts 122 by means such as the nuts 128. The bearing pads 126, which may be of a material such as TEFLON, provide a mating surface such that the plate can slide along the bearing pad 126 while still being supported thereby.

The plate 118 and the bolts 122 provide vertical support for the termination 110 while at the same time permitting horizontal movement of the transition member 14 and the termination 10 due to means such as thermal expansion of the transmission line 12. If the transition member 14 moves horizontally, the frame structure 110 and the plate 118 secured thereto will also move horizontally, but the anchor bolts 122 will remain fixed in their location in the base 108. The plate 118 is permitted this horizontal movement because the bolts 122 extend through the slots 120, and therefore the plate 118 can slide while the bolts 122 remain disposed within the slots 120. The vertical support is provided by the collar 124 and the bearing pad 126.

Thus, it can be seen that the apparatus of this invention provides support for a gas-to-air termination while providing for thermal expansion of the transmission line to which it is interconnected.

I claim as my invention:

1. Gas-insulated electrical apparatus comprising:
   a vertically disposed gas-insulated termination comprising a hollow insulating shell, a termination conductor disposed within said insulating shell, support means supporting said termination conductor within said insulating shell, and a first insulating gas disposed within said insulating shell and electrically insulating said termination conductor from said insulating shell;
   a generally horizontally disposed gas-insulated transmission line comprising an outer sheath, an inner conductor disposed within said outer sheath, support means insulatably supporting said inner conductor within said outer sheath, and a second insulating gas disposed within said outer sheath and electrically insulating said inner conductor from said outer sheath;
   a gas-insulated transition member having a first end section aligned with said termination and a second end section aligned with said transmission line, said transition member comprising an outer housing fixedly secured at a first end section to said insulating shell and at a second end section to said outer sheath, a transition conductor disposed within said outer housing and fixedly secured at a first end section to said termination conductor and at a second end section to said inner conductor, and a third insulating gas disposed within said outer housing and electrically insulating said transition conductor from said outer housing; and
   means for supporting said termination comprising a base, a frame member fixedly secured to said outer housing and extending outwardly therefrom, and means for slidingly supporting said frame member on said base.

2. The apparatus according to claim 1 wherein said frame member includes a horizontally disposed plate having a horizontally extending opening therethrough, and said frame member support means includes said base having rigid anchoring means extending outwardly therefrom through said plate opening and bearing means secured to said anchoring means intermediate said base and said plate, said plate being supported by said bearing means.

3. Apparatus according to claim 1 including a vertically disposed gas-insulated extension line aligned with said termination and said transition member first end section, said extension line comprising an outer enclosure secured to said insulating shell and said outer housing first end section, an extension conductor disposed within said outer enclosure and secured to said termination conductor and said transition conductor first end section, and a fourth insulating gas disposed within said outer enclosure and electrically insulating said extension conductor from said outer enclosure.

4. Apparatus according to claim 3 wherein said first, second, third and fourth insulating gases are in fluid communication with each other.

5. Apparatus according to claim 1 wherein said first, second, and third insulating gases comprise sulfur hexafluoride.

6. Apparatus according to claim 1 wherein said termination is a sulfur hexafluoride-to-air termination.

7. Apparatus according to claim 1 wherein said frame member is welded to said outer housing.

* * * * *